Sept. 6, 1949.            E. D. WILLIAMS            2,481,460
VALVE ASSEMBLY
Filed April 21, 1945
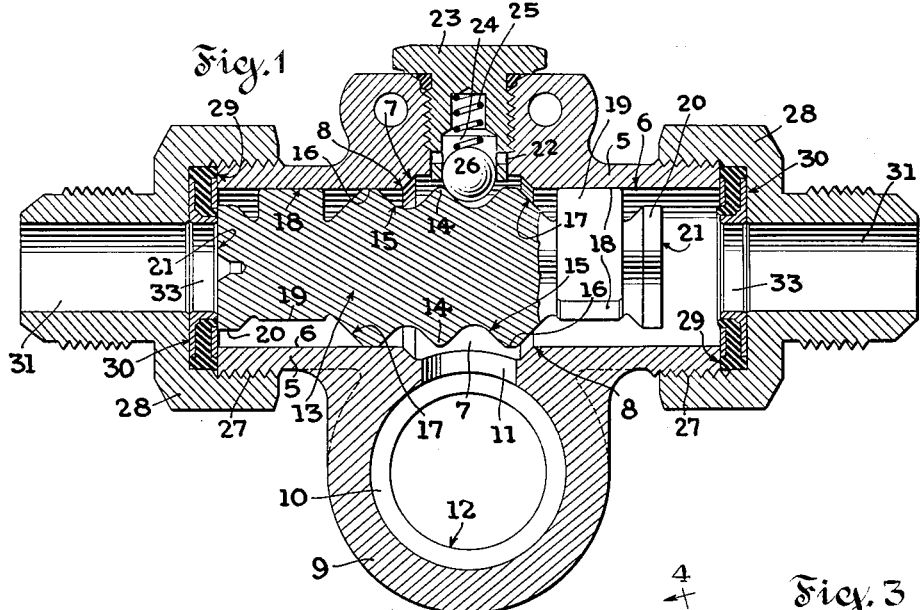
INVENTOR.
Eugene D. Williams
BY
Mason, Porter & Diller
Attorneys Patented Sept. 6, 1949

2,481,460

UNITED STATES PATENT OFFICE 2,481,460

VALVE ASSEMBLY

Eugene D. Williams, Cleveland, Ohio, assignor to The Parker Appliance Company, Cleveland, Ohio, a corporation of Ohio Application April 21, 1945, Serial No. 589,552

7 Claims. (Cl. 251—167)

The invention relates generally to valve structures and primarily seeks to provide a novel valve assembly in which there are included a seat structure having a rubber or equivalent seating portion, and a valve member engageable with the seat and designed to cooperate with the seat in a manner assuring the desired flow control without danger of pinching the rubber seating portion and without destructive wire drawing effects incident to the moving of the valve member against and away from contact with the seat.

I am aware that valve structures embodying shiftable valve members and seats including rubber seating portions have been provided heretofore, but all such structures of which I am aware have been found not entirely satisfactory because they were difficult and too costly to manufacture and inefficient in operation, or in many cases objectionable because they were so designed that as soon as the valve member left its seat or came close to contact therewith the wire drawing effect of the fluid flowing at very high velocity past the rubber seat portion acted to cut and ultimately destroy said seat portion. It is a purpose of the present invention to provide a novel valve assembly in which the objectionable features referred to have been eliminated.

An object of the invention is to provide a valve assembly of the character stated in which there are included a casing having an inlet and an outlet, a seat having a rubber seating portion, and a valve member movable into and out of contact with said seating portion, said casing and valve member having cooperatively engaging flow controlling surface portions effective to eliminate high velocity flow past the rubber seating portion when the valve member is only slightly away from the seat and permit free flow through the casing only after the valve member is a substantial distance away from the seat.

Another object of the invention is to provide a valve assembly of the character stated in which the seat comprises a flat metal ring having a central flow passage, a peripheral annulus of rubber or equivalent deformable material surrounding the ring and normally projecting beyond both faces thereof in the axial direction and a seating portion annulus of said deformable material extending from the inner face of the ring for engagement by the shiftable valve member, the casing having a port adapter secured to an end thereof and said ring being clamped in metal to metal contact between the adapter and the casing end with peripheral annulus deformed in sealing contact against said casing end and adapter.

Another object of the invention is to provide a novel valve seat of the character stated comprising a flat metal ring having a central flow passage, an annular groove surrounding the passage in one face thereof, a plurality of radial bores extending through the ring periphery into said groove, an annulus of rubber or equivalent deformable material in and extending slightly as a deformable seating portion from said groove, and a peripheral annulus of said deformable material surrounding the ring and normally projecting beyond both faces thereof in the axial direction and joined integrally with the groove carried annulus by pieces extending through said radial bores.

Another object of the invention is to provide a novel valve seat of the character stated in which the ring surrounding and groove mounted annuli are not adhered to the ring but are free to slide relative thereto as they are deformed incidental to the securing of the valve seat in the valve assembly or the engagement or disengagement of the valve member with or from the seat.

With the above and other objects in view that will hereinafter appear, the nature of the invention will be more clearly understood by reference to the following detailed description, the appended claims, and the several views illustrated in the accompanying drawing.

In the drawing:

Figure 1 is a longitudinal sectional view illustrating a valve assembly embodying the invention.

Figure 2 is an end elevation, parts being broken away and in section.

Figure 3 is a face view illustrating the seat structure per se.

Figure 4 is a vertical cross section taken on the line 4—4 of Figure 3.

Figure 5 is an enlarged fragmentary sectional view illustrating portions of the deformable annuli projecting beyond the face of the seat ring.

In the example of embodiment of the invention herein disclosed, the invention is illustrated as incorporated in a shuttle valve structure, but it will become apparent as the description progresses that the novel structures can be incorporated as well in other forms of valves such as relief valves, check valves, poppet valves, or even in globe or needle valves wherein the valve element is moved toward and away from its seat by a screw.

In the valve structure herein disclosed, there is included a casing 5 having an axial bore 6 with a central enlargement 7 including bevel ends merging into the bore 6 and defined endwise by the annular edges 8.

The casing includes a bottom extension 9 having a chamber 10 and communicating through a passage 11 with the enlargement 7 disposed centrally of the ends of the casing in the manner illustrated in Figure 1. The bottom extension 9 is open through the side as at 12 for connection with a conduit leading to a motor or other point of distribution of fluid entering from one or the other of the ends of the bore 6.

A shuttle valve generally designated 13 is reciprocably mounted in the casing bore 6 and includes a central, annular inverted V-shaped rib 14 flanked by two deep annular grooves 15. Endwise of each of the annular grooves 15 there is provided a cylindrical body portion 16 dimensioned to have snug sliding fit in the casing bore 6. Endwise of each body portion 16 the valve member is tapered as at 17 to provide a deep annular groove inwardly of a spider portion 18, which includes three circumferentially spaced, bore contacting surfaces 19 and three intermediate flattened clearances or flow passages 19. Endwise of each of the spider portions, the valve member is provided with a reduced diameter cylindrical end portion 20 which terminates in a flat seating portion 21.

Within the enlargement 7 the casing is provided with a radial bore 22 which is internally threaded to receive a closure cap 23 having a ball chamber 24 therein. The cap 23 is equipped with a compression spring 25 and a detent ball 26, the spring serving to constantly and yieldably urge the detent ball against the rib 14 of the longitudinally shiftable shuttle valve member 13 in the manner illustrated in Figure 1.

Each end extremity of the casing portion in which the longitudinal bore 6 is formed is externally threaded as at 27 and has a port adapter 28 threadably mounted thereon. It will be apparent by reference to Figure 1 that the casing provides flat annular end portions which oppose and cooperate with flat shoulders or abutment walls 30 on the port adapters in removably securing seat structures in the valve assembly in position for being engaged by the respective end of the shuttle valve member 13. It will also be apparent that each port adapter includes a port bore 31, said bores being axially aligned with each other and with the casing bore 6.

The seat structure embodying the invention is illustrated in detail in Figures 3, 4 and 5 of the drawing, and one such seat structure is shown mounted in each end of the valve assembly in Figure 1, being securely clamped in place between the abutment walls 29 and 30 provided on the casing ends and the port adapters respectively.

Each novel seat structure includes a metal ring 32 having a central bore 33 corresponding in size to and adapted to align with the port adapter bores 31. Each ring also is equipped with an annular groove 34 in one face thereof and concentrically surrounding the flow passage or bore 33, and a plurality of radial bores 35 extending through the periphery of the ring into said groove 34 in the manner clearly illustrated in Figures 3 and 4. An annulus 36 of rubber or equivalent deformable material surrounds the periphery of the metal ring 32 and projects axially beyond the opposite faces of said ring in the form of rounded end portions 37. The annulus 36 preferably is molded on the metal ring and integrally connected, by radial pieces 38 extending through the bores 35, with a deformable annulus 39 mounted in the groove 34 and projecting therefrom in the form of a rounded seat portion 4 as illustrated in Figures 4 and 5.

While the integral structure of deformable material comprising the annulus 36, the radial pieces 38 and the annulus 39 is molded on the metal ring 32, the annuli are not adhered to the metal but are free to move relative thereto. It will be apparent by reference to Figures 4 and 5 of the drawing that the seating portion 40 of the annulus 39 projects the same distance from the respective face of the metal ring 32 as does the respective end portion of the annulus 36, and the seating portion or annulus 40 is rounded in the manner clearly illustrated in Figure 5. It will also be apparent by reference to Figure 5 that the projecting rounded portions of the annulus 36 are rounded on arcs the centers of which are disposed inwardly of the opposite faces of the ring 32 so as to leave clearances 41 into which the projecting annulus portions can be deformed without being pinched by the peripheral edges of the metal ring when the seat structures are clamped between the abutment walls 29 and 30 in the mounting thereof as illustrated in Figure 1. Also, by reason of the fact that the annuli 36 and 39 are not adhered to the metal of the ring 32, they may slide relative to the metal ring surfaces when the seat structures are mounted as indicated in Figure 1, as illustrated at 42 in Figure 5, and as at 43 in Figure 5 when the shuttle valve member 13 comes against the seating portion 40 as at the left in Figure 1.

It will be obvious that the shuttle valve 13 will be shifted to one end or the other of the casing bore 6 depending upon which pressure is dominant at the alternate inlets 31 at opposite ends of the casing, and the detent ball 26 will yieldably retain the shuttle valve in the position to which it is shifted by the incoming dominant pressure. The dominant incoming pressure will freely pass the reduced diameter seating end portion 20 and the spider at the respective end of the valve assembly, and in the fully open position of the valve, illustrated at the right in Figure 1, will pass between the bevelled enlargement end as at 8 and the parallel spaced tapered or grooved portion 17 at the respective end of the valve, and turn into the passage 11 and the outlet 12 of the casing extension 9. It will be noted by reference to the left hand portion of Figure 1 that the snugly slidable cylindriform portion 16 at each end of the shuttle valve is so spaced with relation to the cooperating seating structure and the edge 8 defining the entrance into the central enlargement 7 that when the seating portion 21 of the shuttle valve initially moves away from the seating portion 40 the incoming fluid cannot rush freely at high velocity directly to the valve outlet because of the close fitting of the cylindrical portion 16, and the incoming fluid will not thus be freed until said cylindrical portion passes inwardly beyond the edge 8, or in other words into the enlargement 7. Thus there is never a high velocity wire drawing effect past the yieldable seating portion 40 which would tend to cut the deformable annulus and quickly impair its efficiency. In other words, there will not be a high velocity flow past the seating portion even though the valve member should hover or stop just after it leaves its seat, or move slowly away from the seat, because at such a position the only flow past the seat portion is the very slight flow which will pass through the annular clearance between the shuttle valve member and the casing body. Then, only after the valve member end portion 21 is well away from the seating portion 40, or in other words only after the edge 8 is uncovered, is there any appreciable flow past said seating portion.

While one form of the invention has been shown for purposes of illustration, it is to be clearly understood that various changes in the details of construction and arrangement of parts

I claim:

1. A valve seat structure comprising a flat metal ring having a central flow passage, an annular groove in one face of the ring and surrounding said flow passage, an annulus of deformable material in and extending slightly as a yieldable seating ring portion from said groove, and a peripheral annulus of said deformable material surrounding the ring and projecting beyond both faces thereof in the axial direction.

2. A valve seat structure comprising a flat metal ring having a central flow passage, an annular groove in one face of the ring and surrounding said flow passage, a plurality of radial bores extending through the ring periphery into said groove, an annulus of deformable material in and extending slightly as a yieldable seating ring portion from said groove, and a peripheral annulus of said deformable material surrounding the ring and projecting beyond both faces thereof in the axial direction and joined integrally with the groove carried annulus by pieces extending through said radial bores.

3. A valve seat structure comprising a flat metal ring having a central flow passage, an annular groove in one face of the ring and surrounding said flow passage, an annulus of deformable material in and extending slightly as a yieldable seating ring portion from said groove, and a peripheral annulus of said deformable material surrounding the ring and projecting beyond both faces thereof in the axial direction, said ring surrounding and groove carried annuli being free to slide relative to the ring periphery and the groove walls respectively as said annuli are deformed incidental to the securing of the valve seat in a valve assembly or the engagement or disengagement of a valve member with or from the seat.

4. A valve seat structure comprising a flat metal ring having a central flow passage, an annular groove in one face of the ring and surrounding said flow passage, a plurality of radial bores extending through the ring periphery into said groove, an annulus of deformable material in and extending slightly as a yieldable seating ring portion from said groove, and a peripheral annulus of said deformable material surrounding the ring and projecting beyond both faces thereof in the axial direction and joined integrally with the groove carried annulus by pieces extending through said radial bores, said ring surrounding and groove carried annuli being free to slide relative to the ring periphery and the groove walls as said annuli are deformed incidental to the securing of the valve seat in a valve assembly or the engagement or disengagement of a valve member with or from the seat.

5. A valve seat structure comprising a flat metal ring having a central flow passage, an annular groove in one face of the ring and surrounding said flow passage, an annulus of deformable material in and extending slightly as a yieldable seating ring portion from said groove, and a peripheral annulus of said deformable material surrounding the ring and projecting beyond both faces thereof in the axial direction, each said projecting part of the ring surrounding annulus being rounded in radial cross section with the center of curvature of each rounded portion disposed inwardly beyond the respective ring face thereby to provide clearances into which the projecting ring surrounding annulus portions can be deformed during the securing of the seat in a valve assembly without pinching thereof.

6. In a valve assembly, a casing having an outlet and a valve member receiving bore extending through an end of the casing, a port adapter removably secured on said casing end and having an inlet bore therein aligned with the casing bore, said casing end and adapter presenting opposing abutment wall portions, a valve seat structure clamped between said wall portions and comprising a flat metal ring having a central flow passage aligned with said bores, an annular groove facing the casing bore and surrounding said flow passage, a plurality of radial bores extending through the ring periphery into said groove, an annulus of deformable material in and extending slightly as a yieldable seating ring portion from said groove, and a peripheral annulus of said deformable material surrounding the ring and of a size for constantly tending to project axially beyond each face of the ring and being joined integrally with the groove carried annulus by pieces extending through said radial bores, said abutment wall portions engaging in metal to metal contact with both faces of the ring with the peripheral annulus deformed between them.

7. In a valve structure, a casing having a flow chamber and an end face surrounding one extremity of said flow chamber, a cap member mounted on said casing and having a bore therethrough and having a clamping face opposed to said end face, a metallic valve seat member interposed between said cap and said casing and adapted to be clamped between the said faces into metal to metal contact therewith and having a flow passage for communication with said bore and said flow chamber, a deformable sealing element surrounding said valve seat member and projecting from opposite sides thereof and adapted to be deformed into sealing contact with said faces, an annular deformable valve-seating portion exposed in said chamber at one face of said valve seat member spaced inwardly from said sealing element and deformable portions interiorly of the metallic valve seat member connecting said sealing element and said valve-seating portion, said metallic valve seat member serving to limit the amount to which said sealing element may be deformed by said end face and said clamping face.

EUGENE D. WILLIAMS.

REFERENCES CITED

The following references are of record in the file of this patent:

UNITED STATES PATENTS

| Number | Name | Date |
|---|---|---|
| 874,652 | Bailey | Dec. 24, 1907 |
| 1,882,433 | MacClatchie | Oct. 11, 1932 |
| 2,136,835 | Begg | Nov. 15, 1938 |
| 2,178,876 | MacClatchie | Nov. 7, 1939 |
| 2,300,694 | Overbeke | Nov. 3, 1942 |
| 2,348,548 | Koehler | May 9, 1944 |
| 2,360,839 | Barksdale | Oct. 24, 1944 |
| 2,386,585 | Blank | Oct. 9, 1945 |

FOREIGN PATENTS

| Number | Country | Date |
|---|---|---|
| 12,911 | Great Britain | June 7, 1904 |
| 333,365 | Great Britain | Aug. 14, 1930 |
| 533,120 | France | Nov. 30, 1921 |